US008140620B2

(12) United States Patent
Creamer et al.

(10) Patent No.: US 8,140,620 B2
(45) Date of Patent: *Mar. 20, 2012

(54) SERVICE FOR PROVIDING PERIODIC CONTACT TO A PREDETERMINED LIST OF CONTACTS USING MULTI-PARTY RULES

(75) Inventors: Thomas E. Creamer, Boca Raton, FL (US); Peeyush Jaiswal, Boca Raton, FL (US); Victor S. Moore, Lake City, FL (US); Anilkumar B. Patel, West Palm Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 525 days.

This patent is subject to a terminal disclaimer.

(21) Appl. No.: 12/276,000

(22) Filed: Nov. 21, 2008

(65) Prior Publication Data
US 2009/0077116 A1      Mar. 19, 2009

Related U.S. Application Data

(63) Continuation of application No. 10/736,024, filed on Dec. 15, 2003, now Pat. No. 7,478,127.

(51) Int. Cl.
*G06F 15/16* (2006.01)
(52) U.S. Cl. .. 709/204; 709/206; 709/217; 707/E17.044
(58) Field of Classification Search ................... 709/204, 709/206, 217; 707/E17.044
See application file for complete search history.

(56) References Cited

U.S. PATENT DOCUMENTS

| 5,920,692 | A | 7/1999 | Nguyen et al. |
| 5,926,100 | A * | 7/1999 | Escolar ...................... 340/691.3 |
| 2001/0032240 | A1 | 10/2001 | Malone et al. |
| 2002/0188688 | A1 * | 12/2002 | Bice et al. ..................... 709/206 |
| 2003/0014297 | A1 | 1/2003 | Kaufman et al. |
| 2003/0112952 | A1 * | 6/2003 | Brown et al. ............ 379/211.01 |
| 2003/0141977 | A1 | 7/2003 | Brown et al. |
| 2004/0059781 | A1 * | 3/2004 | Yoakum et al. ............... 709/204 |

FOREIGN PATENT DOCUMENTS

| JP | 2001-230883 | 8/2001 |
| WO | WO 03/044755 | 5/2003 |

* cited by examiner

*Primary Examiner* — Kyung H Shin
(74) *Attorney, Agent, or Firm* — Novak Druce + Quigg LLP

(57) ABSTRACT

A method, a system, and an apparatus for permitting a user to remain in contact with at least one other person. The present invention provides a method, a system, and an apparatus that is capable of enabling a user to remain in contact with others through a service that checks contacts set up in a predetermined contact list. The contact list is then contacted and the user is contacted with the results. As such, the present invention permits the user to remain in contact with a significant number of entities while saving time and effort by ensuring the user is only contacted with certain information. The system and method also permits the user to remain in contact even when the user is unavailable.

10 Claims, 2 Drawing Sheets

100

```
┌─────────────────────────────┐
│  Subscriber sets up contact │
│ list(s), services rules, and│
│            like             │
│                         105 │
└─────────────────────────────┘
              ↕
┌─────────────────────────────┐
│   Service administration    │
│                         110 │
└─────────────────────────────┘
              ↓
         Contact DB
            115
```

FIG. 1

SERVICE FOR PROVIDING PERIODIC CONTACT TO A PREDETERMINED LIST OF CONTACTS USING MULTI-PARTY RULES

CROSS REFERENCE TO RELATED APPLICATIONS

This application is a continuation of, and accordingly claims the benefit of U.S. patent application Ser. No. 10/736,024, filed with the U.S. Patent and Trademark Office on Dec. 15, 2003, now U.S. Pat. No. 7,478,127.

BACKGROUND

1. Field of the Invention

The present invention relates to the field of service administration and, more particularly, to user-specific contact services.

2. Description of the Related Art

Remaining in contact with others has become more prevalent over the past few years. Originally, pagers were used to contact someone in an emergency. Cellular phones, which were only used by a minority a few years ago, are now extremely prevalent and owned by a significant portion of the population. Personal digital assistants (PDA) are also becoming much more prevalent as a wireless solution that permits individuals to stay connected with wireless access to email, corporate data, phone, web and other organizer features.

Nevertheless, there are instances when individuals still are unable to connect with others. For example, the individual may be in a meeting or otherwise disposed. Alternatively, the individual may be in an area where they are unable to receive a signal from a cellular phone, PDA or the like. This is especially true for those individuals that are traveling.

As people travel, they are often out-of-touch with others for various periods of time. For example, when traveling by plane, individuals are unable to use cellular phones or any other devices to remain in contact should others need to contact the individual. Additionally, even though many planes offer phone services, an individual is not likely going to use this service if the individual believes everything to be OK and someone trying to contact the individual would have no way of calling the individual using the airplane phone system.

In addition, it may be very time-consuming and expensive for travelers to contact others prior to or immediately after embarking on a trip, such as airplane travel. If a traveler wishes to check in with a significant number of people, the traveler may not have sufficient time prior to departure. Additionally, one or more of these persons may only be available while the traveler is unavailable such that the traveler is not able to contact that person until much later.

Also, while traveling, many travelers may only wish to know whether something is wrong and not when everything is OK. However, by calling each person individually, the traveler may waste time and effort speaking to those that are fine and may never find out from other contacts whether something is wrong.

Accordingly, it would be beneficial to provide a service to users to permit the user to remain in contact with people. It would also be beneficial to provide a service to users that would enable the user to check with multiple people while the user is unavailable. It would also be beneficial to provide a service to users that would permit users to determine in which instances the user will be contacted.

SUMMARY OF THE INVENTION

The present invention provides a method, a system, and an apparatus for permitting a user to remain in contact with other people. More specifically, the present invention is capable of enabling a user to remain in contact with others through a service that checks contacts set up in a predetermined contact list. The contact list is then contacted and the user is contacted with the results. As such, the present invention permits the user to remain in contact with a significant number of people while saving time and effort by ensuring the user is only contacted with certain information. The system and method also permits the user to remain in contact even when the user is unavailable. The present invention is especially beneficial to those who travel extensively and/or those in the medical profession.

In general, the present invention provides a method of providing a service for permitting a user to remain in contact with other people. In the method, the service is started by the service administration. The service administration reads a database established by the user of the user's contact list. The service administration reads the first contact in the list of contacts to be reached. The list of contacts may include persons or other entities, such as businesses or other organizations. Then, the service administration contacts the contact in the contact list according to service rules established by the user. The service administration then obtains the requested information from the contact and determines whether the information collected satisfies the contact rules established by the user. If the contact rules are not satisfied, the service administration obtains the next contact in the list of contacts and so on. If the information collected satisfies the contact rules established by the user, then the service administration contacts the user using the contact rules and then the service administration delivers the response or message. The service administration then returns to the start of the service execution.

More particularly, in one embodiment, the present invention provides a method for permitting a user to remain in contact with at least one other entity including establishing a contact list including the at least one other entity; establishing at least one service rule used for contacting the at least one other entity; and establishing at least one contact rule used for contacting the user after the at least one other entity has been contacted. As used herein, the term "entity" is any contact that a user may include in a contact list including, but not limited to, persons, business, organizations, and a combination thereof.

More particularly, in another embodiment, the present invention provides a machine-readable storage having stored thereon, a computer program having a plurality of code sections, said code sections executable by a machine for causing the machine to perform the steps of establishing a contact list including the at least one other entity; establishing at least one service rule used for contacting the at least one other entity; and establishing at least one contact rule used for contacting the user after the at least one other entity has been contacted.

In yet another embodiment, the present invention provides a system for permitting a user to remain in contact with at least one other person including means for establishing a contact list including the at least one other entity; means for establishing at least one service rule used for contacting the at least one other entity; and means for establishing at least one contact rule used for contacting the user after the at least one other entity has been contacted.

BRIEF DESCRIPTION OF THE DRAWINGS

There are shown in the drawings, embodiments which are presently preferred, it being understood, however, that the invention is not limited to the precise arrangements and instrumentalities shown.

FIG. 1 is a flow chart illustrating a method for permitting a user to remain in contact with other people in accordance with the inventive arrangements disclosed herein.

DETAILED DESCRIPTION OF THE INVENTION

Figure 2:
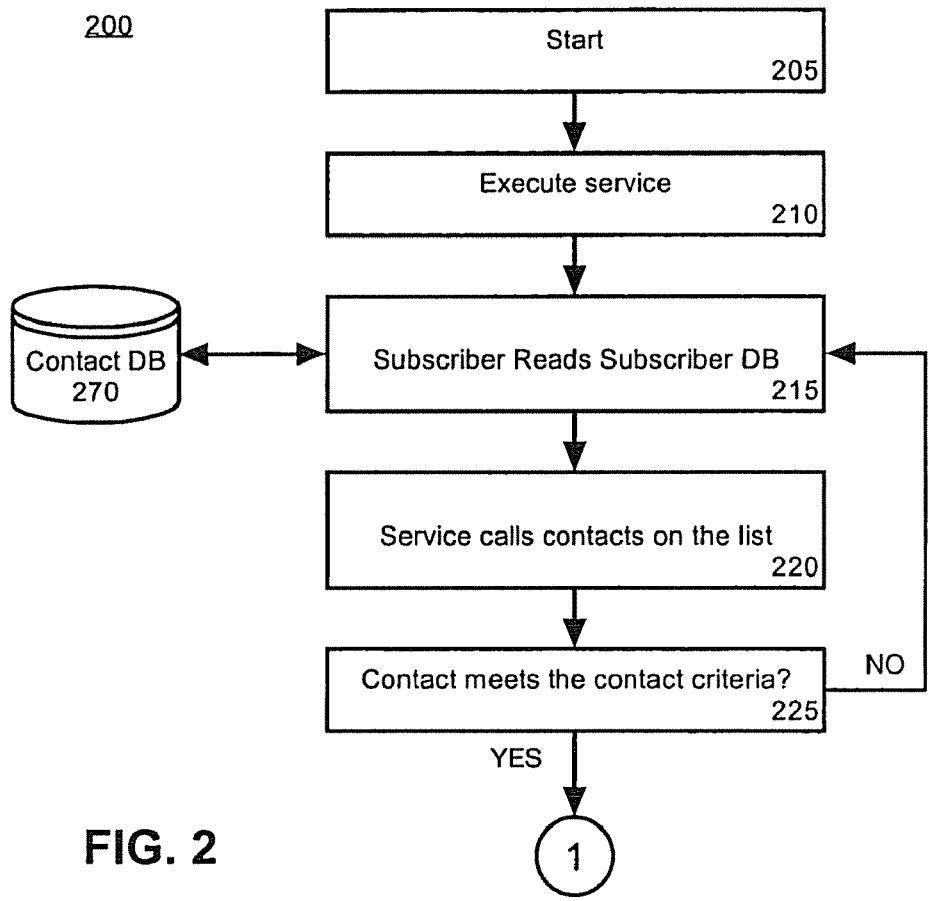
FIG. 2 is a flow chart illustrating a method for contacting people in a service for permitting a user to remain in contact with other people in accordance with one embodiment of the inventive arrangements disclosed herein.

The present invention provides a method, a system, and an apparatus for permitting a user to remain in contact with other entities while the user is unavailable or unable to contact these entities. More specifically, the present invention provides a service that enables users to remain in contact with others by checking with the user's contacts that have been established in a predetermined contact list. After the contact list has been contacted, the user is contacted with the results if they include results specified by the user. As such, the present invention permits the user to remain in contact with a significant number of people while saving time and effort by ensuring the user is only contacted with certain information.

The present invention provides a method, a system, and an apparatus for permitting a user to remain in contact with other entities while the user is unavailable or unable to contact these entities by first having the user establish a contact list. The contact list of people (contacts) includes each person's name and the means by which they may be contacted. These means may include, but are not limited to, telephone numbers, fax numbers, email addresses, short message services, such as text messaging, and the like. The contact list may include a primary contact means and/or number as well as secondary contact means in the event the contact is unable to be reached using the primary means of contact. Additionally, the contact list may also include entities including, but not limited to, businesses and organizations.

Once the user has established the contact list, the user then establishes the service rules for each contact. Service rules are those rules that are to be followed when attempting to reach each contact in the contact list. Service rules may include, but are not limited to, the manner in which the contact each entity, specific instructions once the contact is reached, whether speaker verification is required, the time period for reaching the contact, the time zone of the contact, and a combination thereof. More specifically, in regards to the time zone of the contact, the system and method of the present invention may be made aware of the local time of the contact to ensure that the contact is not contacted at an inconvenient time, such as early in the morning or late at night. This may especially be true if the contact is a business to ensure that the contact is within the office hours of the business.

The service rules may be standard rules to be applied for each contact. Alternatively, in another embodiment, the service rules may be contact-specific and different for each contact. In yet another alternative embodiment, some contacts may be grouped together and have a specific set of service rules for these contacts while other contacts have their own service rules.

Once the service rules have been established, the user then establishes the rules by which the user is contacted after the contact list has been surveyed. These "contact rules" may include almost any rule depending on the user. For example, a user may simply wish to be contacted only when something is wrong with one or more of the user's contacts. Conversely, the user may be contacted if everything is OK. The contact rules also include the manner in which the user is to be contacted, for example by email, phone, fax, SMS or a combination thereof. The contact rules may also establish a secondary contact in the event the user is not able to be reached, such as, for example, the user's spouse.

In user, the system and method of the present invention combine to provide a service for permitting users to remain in contact with others. Once the user has subscribed to the service and established the contact list, service rules and contact rules, the service remains in place until such time as the user initiates the service. At that point, the system and method of the present invention begins with the first contact on the contact list and attempts to contact the first contact according to the service rules. Once the first contact is contacted, the service then obtains the information requested by the user. If the information qualifies as information the user wanted to know about, i.e. the contact rules have been satisfied, then the user is contacted and the information is delivered. Or, in an alternative embodiment, the information may be put in a queue to be delivered to the user when the user is available. The service then proceeds to the next contact and the method repeats.

In an alternative environment, all of the contacts in the contact list are contacted prior to any of the information being delivered to the user. As such, the user is not subjected to numerous emails or calls for each contact, but rather a single email or phone call stating which contacts had information that satisfied the contact rules and delivering all of the information at one time.

In yet another embodiment, the service may inform the user as to which contacts the service was unable to contact such that the user does not automatically presume that none of the contact rules have been satisfied should the user receive no information regarding a particular contact.

FIG. 1 is a flow chart illustrating a method 100 for permitting a user to remain in contact with other entities while the user is unavailable or unable to contact these entities. In the method 100, step 105 is the step where the user/subscriber sets up the user's contact list, service rules and contact rules. Next, in step 110, the service administration contacts the entities in the contact list database 115 using the service rules established by the user. Then, the service administration 110 contacts the user based upon the user's contact rules. In another embodiment, the service administration 100 may be modified by the user remotely. As such, the user may turn the service on or off while traveling or during nighttime hours. Alternatively, the user may adjust the service and/or contact rules, also in a remote manner should the user desire to do so.

FIG. 2 is a flow chart illustrating a one embodiment of a method 200 for executing the first portion of the service set forth in FIG. 1. In the method 200, step 205 is the execution of the service by the service administration. In step 210, the service administration reads the user/subscriber database 215 to obtain the first name in the list of contacts to be reached. Then, in step 220, the service administration contacts the first name in the contact list according to the established service rules. The service administration then, in step 225, obtains the requested information from the contact and determines whether the information collected satisfies the contact rules established by the user. If the contact rules are not satisfied, the method 200 returns to step 210 wherein the service administration obtains the next name in the list of contacts. If, in step 225, the information collected satisfies the contact rules established by the user, then the service administration then proceeds to the second portion of the service set forth in FIG. 1—following the contact rules established by the user.

Figure 3:
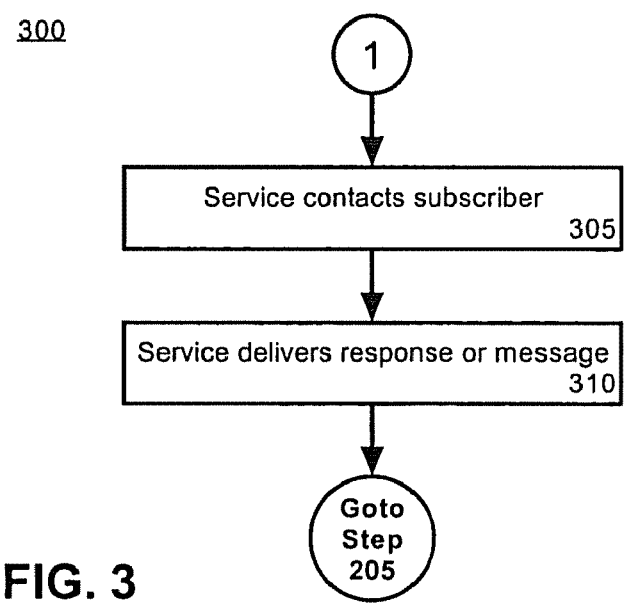
FIG. 3 is a flow chart illustrating a method for contacting people in a service for permitting a user to remain in contact with other people in accordance with another embodiment of the inventive arrangements disclosed herein.

FIG. 3 is a flow chart illustrating a one embodiment of a method 300 for executing the second portion of the service set forth in FIG. 1. In the method 300, the contact rules are executed. In step 305, the service administration contacts the user/subscriber using the contact rules and then, in step 310, the service administration delivers the response or message. The service administration then returns to the start of the service execution 205.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A non-transitory machine-readable storage having stored thereon, a computer program having a plurality of code sections, said code sections executable by a machine for causing the machine to perform the steps of:
    subscribing a user to a service;
    establishing a contact list comprising the at least one other entity to maintain in contact with the user while the user is unavailable or unable to communicate directly with the at least one other entity;
    establishing at least one service rule used for the service to contact the at least one other entity, wherein the at least one service rule defines when and how the at least one other entity in the contact list is to be contacted, wherein the at least one service rule is user-customizable and is followed when attempting to reach the at least one other entity;
    establishing by the user at least one contact rule used for the service to contact the user after the at least one other entity has been contacted, wherein the at least one contact rule defines if, when, and how the user should be contacted;
    when the user is unavailable to initiate contact or upon being activated by the user, the service automatically contacting each entity on the contact list and eliciting specified information according to the at least one service rule;
    obtaining the specified information from the at least one other entity; and
    subsequently conveying the obtained information to the user if the at least one contact rule is satisfied.

2. The non-transitory machine-readable storage of claim 1, wherein the contact list is a database and the contact list includes information selected from names, phone numbers, email addresses, pager numbers, and a combination thereof.

3. The non-transitory machine-readable storage of claim 1, wherein the at least one service rule is selected from how to contact the at least one entity, what to ask the at least one entity, a time period to contact the at least one entity, and a combination thereof.

4. The non-transitory machine-readable storage of claim 1, wherein the contact list comprises at least two entities and the user is contacted after each of the at least two entities is contacted if the at least one contact rule has been satisfied.

5. The non-transitory machine-readable storage of claim 1, wherein the contact list comprises at least two entities and the user is contacted after all of the at least two entities is contacted if the at least one contact rule has been satisfied.

6. A system of permitting a user to remain in contact with at least one other entity while the user is unavailable or unable to communicate directly with the at least one other entity, the system comprising:
    a processor;
    a computer-readable storage having stored thereon a computer program for controlling the processor, the computer program comprising instructions for:
    subscribing a user to a service;
    establishing by the user a contact list comprising the at least one other entity;
    establishing by the user at least one service rule used for the service to contact the at least one other entity, wherein the at least one service rule defines when and how the at least one other entity in the contact list is to be contacted, wherein the at least one service rule is user-customizable and is followed when attempting to reach the at least one other entity;
    establishing by the user at least one contact rule used for the service to contact the user after the at least one other entity has been contacted, wherein the at least one contact rule defines if, when, and how the user should be contacted;
    when the user is unavailable to initiate contact or upon being activated by the user, the service automatically contacting each entity on the contact list and eliciting specified information according to the at least one service rule;
    obtaining the specified information from the at least one other entity; and
    subsequently conveying the obtained information to the user if the at least one contact rule is satisfied.

7. The system of claim 6, wherein the contact list is a database and the contact list includes information selected from names, phone numbers, email addresses, pager numbers, and a combination thereof.

8. The system of claim 6, wherein the at least one service rule is selected from how to contact the at least one entity, what to ask the at least one entity, a time period to contact the at least one entity, and a combination thereof.

9. The system of claim 6, wherein the contact list comprises at least two entities, and wherein the computer program further comprises instructions for contacting the user after each of the at least two entities is contacted if the at least one contact rule has been satisfied.

10. The system of claim 6 wherein the contact list comprises at least two entities and the wherein the computer program further comprises instructions for contacting the user after all of the at least two entities is contacted if the at least one contact rule has been satisfied.

* * * * *